United States Patent
Oga et al.

(10) Patent No.: US 9,643,545 B2
(45) Date of Patent: May 9, 2017

(54) WIRE HARNESS

(71) Applicant: Yazaki Corporation, Minato-ku, Tokyo (JP)

(72) Inventors: Tatsuya Oga, Makinohara (JP); Hideomi Adachi, Makinohara (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 0 days.

(21) Appl. No.: 15/000,082

(22) Filed: Jan. 19, 2016

(65) Prior Publication Data

US 2016/0129861 A1    May 12, 2016

Related U.S. Application Data

(63) Continuation of application No. PCT/JP2014/069099, filed on Jul. 17, 2014.

(30) Foreign Application Priority Data

Jul. 19, 2013 (JP) .................. 2013-150013

(51) Int. Cl.
*H02G 3/04* (2006.01)
*B60R 16/02* (2006.01)
*H01B 7/00* (2006.01)

(52) U.S. Cl.
CPC ......... *B60R 16/0215* (2013.01); *H01B 7/009* (2013.01); *H02G 3/0406* (2013.01)

(58) Field of Classification Search
CPC ............ B60R 16/0215; B60R 16/0207; H02G 3/0406

USPC ....................................................... 174/72 A
See application file for complete search history.

(56) References Cited

U.S. PATENT DOCUMENTS

| 8,563,866 B2 | 10/2013 | Oga et al. |
| 2006/0278423 A1* | 12/2006 | Ichikawa ............ B60R 16/0215 174/72 A |
| 2011/0036616 A1 | 2/2011 | Catchpole et al. |
| 2011/0132638 A1 | 6/2011 | Oga et al. |

FOREIGN PATENT DOCUMENTS

| JP | S60-189116 A | 9/1985 |
| JP | H02-110115 U | 9/1990 |
| JP | H03-138818 A | 6/1991 |
| JP | 2010-051042 A | 3/2010 |
| JP | 2013-020833 A | 1/2013 |

OTHER PUBLICATIONS

Sep. 22, 2014—(WO) IPRP—App PCT/JP2014/069099.
Sep. 22, 2014—ISR—App PCT/JP2014/069099.

* cited by examiner

*Primary Examiner* — Sherman Ng
(74) *Attorney, Agent, or Firm* — Banner & Witcoff, Ltd.

(57) ABSTRACT

A wire harness includes a conducting path. The conducting path includes a conductor and a sheath. The conductor includes a first conductor and a second conductor which are connected to each other. The first conductor is disposed in a route regulation section requiring route regulation. The second conductor is disposed in another section than the route regulation section. The conductor in which the first conductor and the second conductor are connected to each other is covered with the sheath.

3 Claims, 4 Drawing Sheets

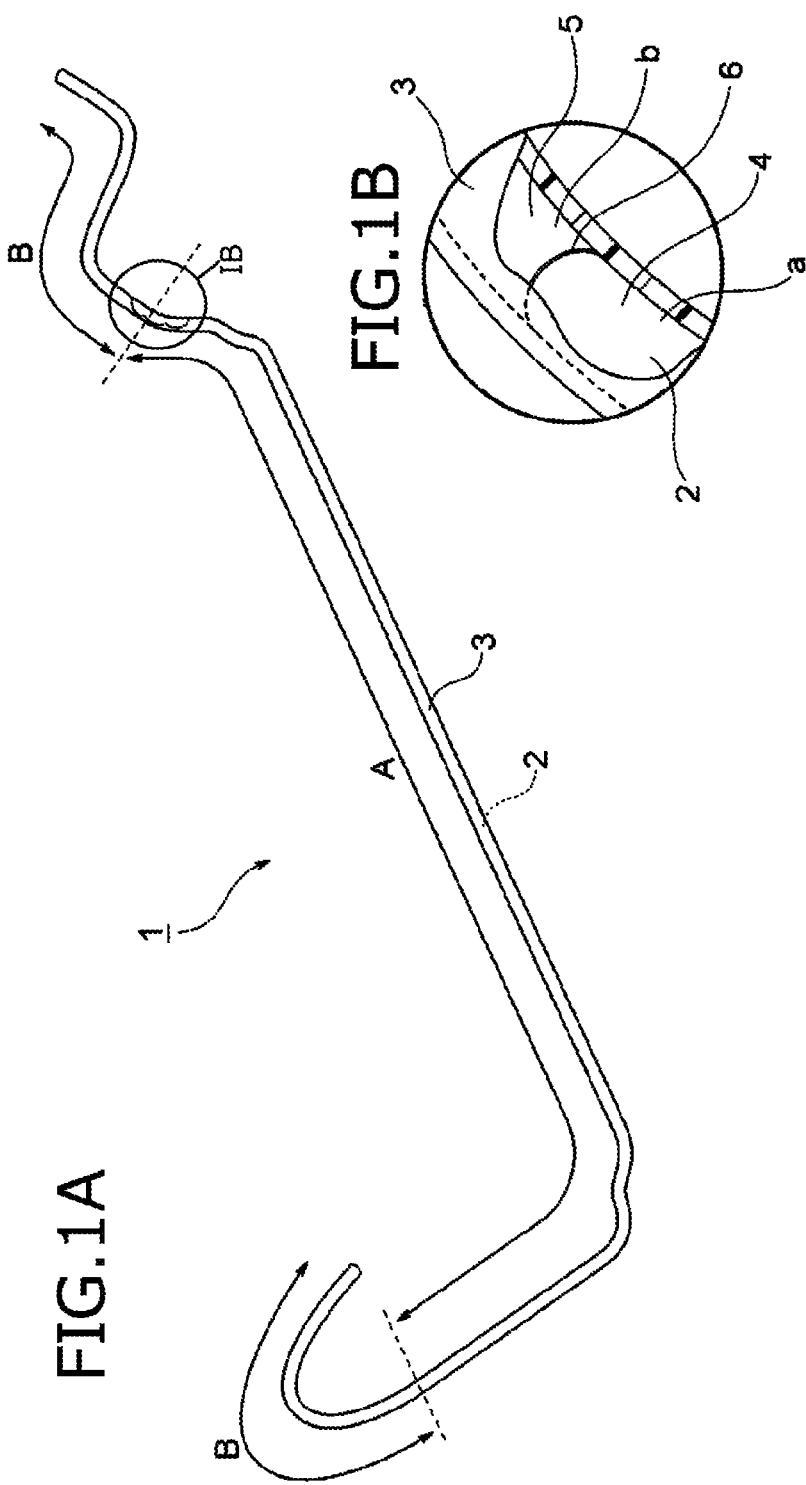

WIRE HARNESS

CROSS REFERENCE TO RELATED APPLICATIONS

This application is a continuation of PCT application No. PCT/JP2014/069099, which was filed on Jul. 17, 2014 based on Japanese Patent Application (No. P2013-150013) filed on Jul. 19, 2013, the contents of which are incorporated herein by reference.

BACKGROUND OF THE INVENTION

1. Field of the Invention

The present invention relates to a wire harness which includes a conducting path or a plurality of conducting paths.

2. Description of the Related Art

According to the background art, there is known a wire harness through which, for example, high-voltage devices mounted in a hybrid car or an electric car are electrically connected to each other.

A wire harness disclosed in the following JP-A-2010-51042 includes a plurality of conducting paths, corrugated tubes which are made of a resin and protectors which are made of a resin. The corrugated tubes and the protectors receive the plurality of conducting paths collectively. Each of the corrugated tubes is formed into a flexible bellows tubular shape. The corrugated tubes are provided side by side in a longitudinal direction of the wire harness. The protectors are provided in portions where route regulation is required. In addition, each of the protectors is provided in a position where adjacent ones of the corrugated tubes are coupled to each other. The corrugated tubes and the protectors are used as exterior members.

According to the background-art technique, retrofitted exterior members are required for route regulation. Accordingly, there are a problem that the number of components may increase to thereby increase the cost, and a problem that the number of man-hours for manufacturing the wire harness may increase.

In order to solve these problems, a structure which dispenses with retrofitted exterior members is demanded. However, when the retrofitted exterior members are dispensed with simply, route regulation cannot be performed.

SUMMARY OF THE INVENTION

The invention has been accomplished in consideration of the aforementioned circumstances. An object of the invention is to provide a wire harness in which route regulation can be performed even without using any retrofitted exterior member and in which cost and the number of man-hours can be reduced because the retrofitted exterior member can be dispensed with.

The aforementioned object of the invention can be achieved by the following configurations.

(1) A wire harness including:
a conducting path,
wherein the conducting path includes a conductor and a sheath;
wherein the conductor includes a first conductor and a second conductor which are connected to each other, the first conductor being disposed in a route regulation section requiring route regulation, the second conductor being disposed in another section than the route regulation section; and
wherein the conductor in which the first conductor and the second conductor are connected to each other is covered with the sheath.

According to the aforementioned configuration (1), the conducting path is included in the configuration of the wire harness, and the conductor path has a structure in which kinds of conductors are connected to each other and the connected conductors are covered with the sheath. Accordingly, the structure of the conducting path is different from a structure in which, for example, kinds of well-known electric wires are connected integrally. In addition, according to the invention, the conductor constituting the conducting path is formed by connecting at least two kinds of conductors, i.e. the first conductor and the second conductor, to each other. The first conductor is disposed in accordance with the route regulation section requiring route regulation. The second conductor is disposed in accordance with another section than the route regulation section. Accordingly, the conductor according to the invention is also different from the conductor structure of any well-known electric wire. By the aforementioned structure, route regulation can be performed even without using any retrofitted exterior member. Incidentally, in the invention, it is effective to connect one conductor (the first conductor) having high rigidity and another conductor (the second conductor) having lower rigidity than the aforementioned conductor.

(2) The wire harness according to the aforementioned configuration (1), wherein in the conductor, the first conductor and the second conductor are connected to each other, and a diameter of the first conductor is substantially same as a diameter of the second conductor.

According to the aforementioned configuration (2), there is provided a structure in which the first conductor and the second conductor are connected to each other without causing any convex portion generated in the outer surface (in other words, the first conductor and the second conductor are connected to each other with substantially the same diameter) and the first conductor and the second conductor connected to each other are covered with the sheath. If no convex portion is generated in the outer surface when the first conductor and the second conductor are connected to each other, it is possible to reduce the influence of connection between the first conductor and the second conductor on formation of the sheath or on the outer surface of the sheath.

(3) The wire harness according to the aforementioned configuration (2), wherein a forming treatment is applied to the first conductor and the second conductor in order to connect the first conductor and the second conductor to each other in a state that the diameter of the first conductor is substantially same as the diameter of the second conductor.

According to the aforementioned configuration (3), even in the case where the first conductor and the second conductor have conductor sizes with different diameters, the first conductor and the second conductor can be connected to each other with substantially the same diameter when forming treatment is applied to the first conductor and the second conductor.

(4) A wire harness according to any one of the aforementioned configurations (1) through (3), wherein a portion of the conducting path corresponding to the route regulation section of the wire harness has rigidity.

According to the aforementioned configuration (4), there is provided a structure in which route regulation is performed with rigidity. The rigidity of the conductor contributes to the route regulation.

According to the invention according to the aforementioned configuration (1), there is obtained an effect that route regulation can be performed even without using any retrofitted exterior member, as understood also from the structure of the conducting path. In addition, according to the invention, there is also obtained an effect that cost and the number of man-hours can be reduced because the retrofitted exterior member can be dispensed with.

According to the invention according to the aforementioned configuration (2), there is also obtained the following effect in addition to the effects of the aforementioned configuration (1). That is, there is obtained an effect that formability of the sheath can be improved or the state of the outer surface of the sheath can be made excellent.

According to the invention according to the aforementioned configuration (3), there is also obtained the following effect in addition to the effect of the aforementioned configuration (2). That is, there is obtained an effect that the first conductor and the second conductor can be connected to each other with substantially the same diameter even in the case where the first conductor and the second conductor have conductor sizes with different diameters.

According to the invention according to the aforementioned configuration (4), there is also obtained the following effect in addition to any of the effects of the aforementioned configurations (1) to (3). That is, there is obtained an effect that it is possible to dispense with any retrofitted exterior member at least in the portion having rigidity.

BRIEF DESCRIPTION OF THE DRAWINGS

FIG. 1A is a perspective view of a conducting path constituting a wire harness and FIG. 1B is an enlarged view of a portion of the conducting path.

DETAILED DESCRIPTION OF THE EXEMPLARY EMBODIMENTS

A wire harness includes a conducting path or a plurality of conducting paths. Each conducting path has a conductor and a sheath. The conductor includes different kinds of conductors connected to each other so that the rigidity of the conductor varies in accordance with sections. The sheath is provided on such a conductor.

Figure 3A:
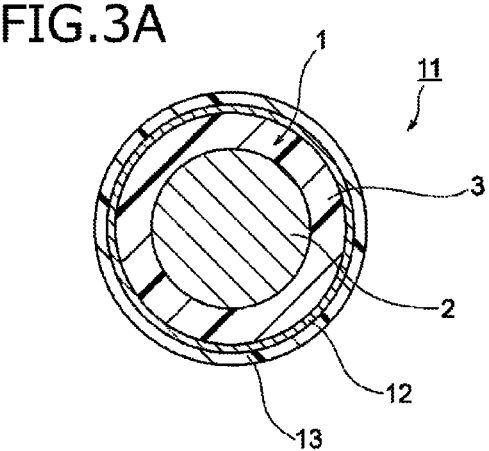
FIGS. 3A and 3B are views of conducting paths as other examples, FIG. 3A being a view showing a one-core configuration, FIG. 3B being a view showing a two-core configuration.
Figure 3B:
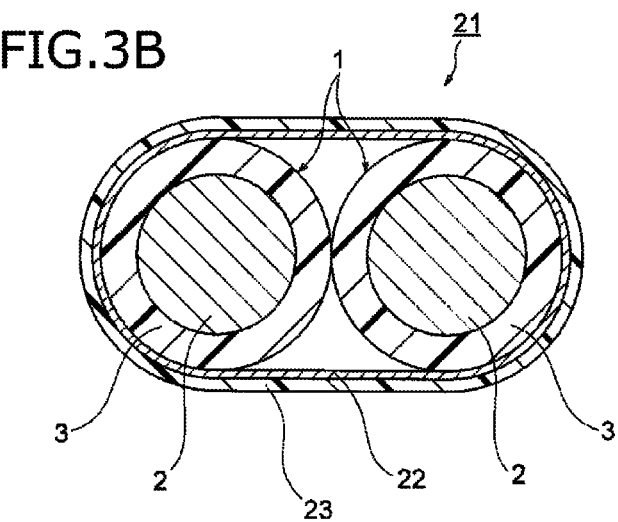
Figure 4:
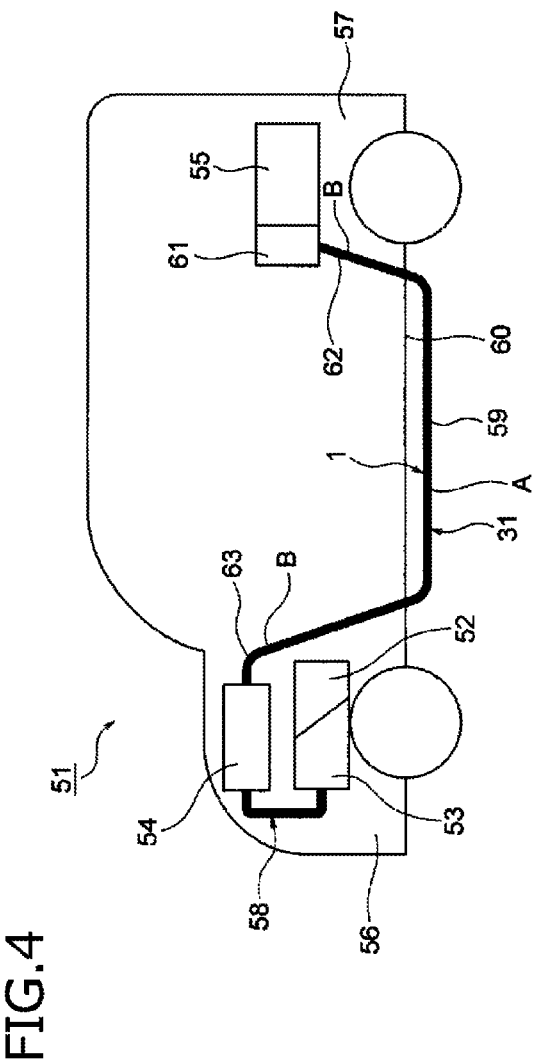
FIG. 4 is a schematic view showing an arrangement state of the wire harness according to the invention.

A wire harness according to an embodiment will be described below with reference to the drawings. FIG. 1A is a perspective view of a conducting path constituting the wire harness according to the embodiment. FIG. 1B is an enlarged view of a portion of the conducting path. FIGS. 2A to 2D are views concerned with the conducting path. FIGS. 3A and 3B are views of conducting paths as other examples. FIG. 4 is a schematic view showing an arrangement state of the wire harness according to the embodiment.

In FIGS. 1A and 1B, the conducting path 1 constituting the wire harness is a high-voltage conducting path which is provided with a conductor 2 and an insulator 3. As will be understood in the following description, the conducting path 1 has a structure divided in accordance with sections.

The conducting path 1 has a portion of a route regulation section A requiring route regulation, and portions of other sections, i.e. other sections B, than the route regulation section A. Incidentally, the number of sections is not limited to two or three, but may be four or more. Here, the route regulation section A is set to be long, and the other sections B are set to have predetermined lengths from opposite ends of the route regulation section A respectively. The portion of the route regulation section A has rigidity high enough to retain its own shape, and the portions of the other sections B have lower rigidity but higher flexibility than the route regulation section A. FIG. 1B is an enlarged view of a portion in the vicinity of a boundary between the route regulation section A and one of the other sections B.

Figure 2A:
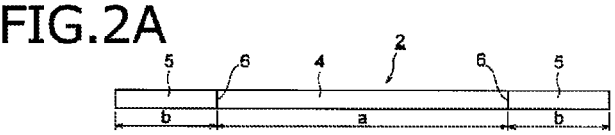
FIGS. 2A to 2D are views concerned with the conducting path, FIG. 2A being a view showing configuration of a conductor, FIG. 2B being a view showing another connection structure, FIG. 2C being a view showing a state in which the conductor in FIG. 2A is covered with an insulator, FIG. 2D being a sectional view of the conducting path.

In FIG. 2A, the conductor 2 is made of metal to be electrically conductive. In addition, the conductor 2 has a portion of a route regulation section "a" and portions of other sections "b". The route regulation section "a" and the other sections "b" correspond to the route regulation section A and the other sections B in FIG. 1A respectively. The route regulation section "a" and the other sections "b" are set to be located in the same positions as the route regulation section A and the other sections B. The conductor 2 has a first conductor 4 serving as the portion of the route regulation section "a", and two second conductors 5 serving as the portions of the other sections "b". The conductor 2 is formed in such a manner that the second conductors 5 are connected to opposite ends of the first conductor 4 integrally. The conductor 2 is initially formed to be straight.

The first conductor 4 and the second conductors 5 are made of copper, a copper alloy, aluminum or an aluminum alloy. Each of the first conductor 4 and the second conductors 5 may have either a conductor structure as twisted strands, or a conductor structure having a shape like a rod rectangular or round in section (e.g. a conductor structure as a square single core or a round single core).

Incidentally, each of the first conductor 4 and the second conductors 5 may have a well-known conductor structure having a shape like a plate such as a bus bar, etc. In addition, the twisted wire may be formed as strands twisted around a core material (a wire rod serving as a rigid body).

Any combination may be selected as the first conductor 4 and each second conductor 5. For example, both the first conductor 4 and the second conductor 5 may have a conductor structure as a single core or a conductor structure as a twisted wire, or one of the first conductor 4 and the second conductor 5 may have a conductor structure as a single core while the other conductor has a conductor structure as a twisted wire. In FIG. 2A, the first conductor 4 is a round single core made of aluminum, and the second conductor 5 on each of the opposite ends of the first conductor 4 is a twisted wire made of copper. The first conductor 4 and the second conductor 5 configured thus are electrically connected to each other. The connection method between the first conductor 4 and the second conductor 5 is not limited particularly but may be ultrasonic welding, thermal welding etc.

Figure 2B:
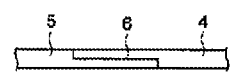

The first conductor 4 and the second conductor 5 may be connected to each other in either of the following manners. That is, end surfaces of the first conductor 4 and the second conductor 5 perpendicular to the axes of the conductors may be made to abut against each other and then connected to each other, or end portions of the first conductor 4 and the second conductor 5 may be substantially processed into crank shapes and then connected to each other as shown in FIG. 2B. In addition, the first conductor 4 and the second conductor 5 may have conductor sizes with one and the same diameter or with different diameters.

Figure 2C:
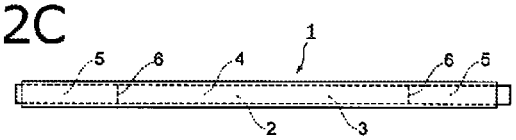

FIGS. 2A to 2C show joint portions 6. When the first conductor 4 and the second conductor 5 have conductor sizes with different diameters, it is effective to apply forming treatment to the first conductor 4 and the second conductor 5 to form a joint portion 6 in order to make the diameters of the first conductor 4 and the second conductor 5 equal to each other.

The first conductor 4 corresponds to the route regulation section A in FIG. 1A. Accordingly, the first conductor 4 is formed to be long, and also formed to have rigidity high enough to retain its own shape. On the other hand, the second conductors 5 correspond to the other sections B in FIG. 1B. Accordingly, the second conductors 5 are formed to have low rigidity but high flexibility. Incidentally, the rigidity high enough to retain the shape of the first conductor 4 means rigidity with which a bent shape of the conducting path 1 can be retained when the conducting path 1 manufactured to be straight is bent by a bender machine etc. The rigidity is effective in arranging the route.

The second conductors 5 correspond to the other sections B. Accordingly, the second conductors 5 are disposed on the end portion sides of the conducting path 1. It is preferable that the second conductors 5 are disposed in places to which flexibility is desired to be given on a wiring route. The places where the second conductors 5 are disposed are not limited to the end portion sides of the conducting path 1.

Figure 2D:
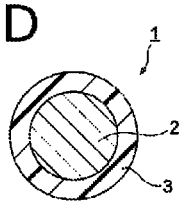

In FIGS. 2C and 2D, when the conductor 2 which is formed by joining the second conductors 5 to the first conductor 4 is covered with the insulator 3, for example, by extrusion molding, outer circumferential surfaces of the first conductor 4 and the second conductors 5 are covered with a predetermined thickness. When the first conductor 4 and the second conductor 5 are covered with the insulator 3, manufacturing of the conducting path 1 is completed.

The insulator 3 is regarded as one made of a well-known resin material having insulating properties. Incidentally, it is also effective to use a functional resin material whose abrasion resistance has been improved (abrasion resistance is simply exemplified).

Here, modifications of the conducting path will be described with reference to FIGS. 3A and 3B. A shield cable (conducting path) 11 is shown in FIG. 3A. The shield cable 11 is provided with a conductor 2, an insulator 3, a shield member 12, and a sheath 13. The conductor 2 is formed by joining second conductors 5 to a first conductor 4 (see FIGS. 2A to 2C). The insulator 3 is provided to cover the conductor 2 formed thus. The shield member 12 is provided on an outer side of the insulator 3. The sheath 13 is provided on an outer side of the shield member 12. That is, the shield cable 11 is provided with a conducting path 1, the shield member 12 and the sheath 13. The shield cable 11 is a high-voltage conducting path having a shielding function. The shield member 12 is a well-known braid or metal foil to be electrically conductive.

Next, a cabtyre cable (conducting path) 21 is shown in FIG. 3B. The cabtyre cable 21 is provided with two conducting paths 1, a shield member 22, and a sheath 23. The shield member 22 is provided on outer sides of the two conducting paths 1 which are arranged side by side. The sheath 23 is provided on an outer side of the shield member 22. The cabtyre cable 21 is a high-voltage conducting path having a shielding function. Similarly to the shield member 12, the shield member 22 is a well-known braid or metal foil to be electrically conductive. Incidentally, the number of the conducting paths 1 may be three or more.

In conjunction with the modifications, the conducting path 1, the shield cable 11 or the cabtyre cable 21 can be used to manufacture a wire harness 31. The wire harness 31 is arranged, for example, in a predetermined position of a hybrid car (which may be replaced by an electric car or a general car), as shown in FIG. 4.

A hybrid car 51 is shown in FIG. 4. The hybrid car 51 is a vehicle which is driven by a mixture of two motive powers of an engine 52 and a motor unit 53. Electric power from a battery 55 (battery pack) is supplied to the motor unit 53 through an inverter unit 54. The engine 52, the motor unit 53 and the inverter unit 54 are mounted in an engine room 56 near front wheels in the embodiment. In addition, the battery 55 is mounted in a car rear portion 57 near rear wheels. However, the battery 55 may be mounted in a car cabin which is located at the rear of the engine room 56.

The motor unit 53 and the inverter unit 54 are connected to each other through a high-voltage motor cable 58. In addition, the battery 55 and the inverter unit 54 are connected to each other through a high-voltage wire harness 31. An intermediate portion 59 of the wire harness 31 is arranged along a vehicle underfloor 60 and substantially in parallel therewith. The intermediate portion 59 is arranged in a shape-retained state. The vehicle underfloor 60 serves as a well-known body and as a so-called panel member, in which through holes (whose reference signs are not shown) are formed in predetermined positions. The wire harness 31 is inserted through the through holes.

The wire harness 31 and the battery 55 are connected to each other through a junction block 61 provided in the battery 55. A rear end 62 of the wire harness 31 is electrically connected to the junction block 61 by a well known method. A front end 63 side of the wire harness 31 is electrically connected to the inverter unit 54 by the well known method. The front end 63 side and the rear end 62 side of the wire harness 31 are flexible so that electric connection of the front end 63 and the rear end 62 of the wire harness 31 can be performed easily.

As have been described above with reference to FIGS. 1A to 4, the conducting path 1 according to the embodiment of the invention is formed in such a manner that the conductor 2 including the first conductor 4 and the second conductors 5 connected to each other in advance is prepared and the conductor 2 is covered with the insulator 3. That is, the conducting path 1 is not a cable formed by preparing kinds of electric wires and connecting the prepared kinds of electric wires one by one.

When the conducting path 1 according to the embodiment of the invention is compared with the aforementioned cable formed by connecting the electric wires one by one, the conducting path 1 is not high in cost. That is, even in the case where there are different requirement specifications within a wiring route, the conducting path 1 can be configured suitably in accordance with the requirement specifications. As a result, the conducting path 1 is not high in cost. In addition, when the kinds of electric wires are connected one by one, insulation treatment, waterproof treatment, etc. are required. On the other hand, since the conducting path 1 according to the invention is formed in such a manner that the conductor 2 including the first conductor 4 and the second conductors 5 connected to each other is covered with the insulator 3, the aforementioned treatments are not required. As a result, the conducting path 1 according to the invention is not high in cost.

On the other hand, according to the wire harness 31 according to the embodiment of the invention, route regulation can be performed even without using any retrofitted exterior member, as understood also from the structure of the conducting path 1. In addition, cost and the number of man-hours can be reduced because the retrofitted exterior member can be dispensed with.

Here, the aforementioned characteristics of the embodiment of the wire harness according to the invention will be summarized and listed briefly in the following configurations [1] to [4].

[1] A wire harness (31) including:
a conducting path (1),
wherein the conducting path (1) includes a conductor (2) and a sheath (insulator 3);
wherein the conductor (2) includes a first conductor (4) and second conductors (5) which a connected to each other, the first conductor (4) being disposed in a route regulation section requiring route regulation, the second conductors (5) being disposed in other sections than the route regulation section; and
wherein the conductor (2) in which the first conductor (4) and the second conductors (5) are connected to each other is covered with the sheath (insulator 3).

[2] The wire harness (31) according to the aforementioned configuration [1], wherein in the conductor (2), the first conductor (4) and the second conductors (5) are connected to each other, and a diameter of the first conductor is substantially same as a diameter of the second conductor.

[3] The wire harness (31) according to the aforementioned configuration [2], wherein a forming treatment is applied to the first conductor (4) and the second conductors (5) in order to connect the first conductor (4) and the second conductors (5) to each other in a state that the diameter of the first conductor is substantially same as the diameter of the second conductor.

[4] The wire harness according to any one of the aforementioned configurations (1) through (3), wherein a portion of the conducting path (1) corresponding to the route regulation section of the wire harness (31) has rigidity.

The invention has been described in detail and with reference to a specific embodiment. However, it is obvious to those skilled in the art that the invention can be changed or modified variously without departing from the spirit and scope of the invention.

According to the invention, there is obtained an effect that it is possible to provide a wire harness in which route regulation can be performed without using any retrofitted exterior member and in which cost and the number of man-hours can be reduced because the retrofitted exterior member can be dispensed with. The invention obtaining the effect is useful for a wire harness including a conducting path or a plurality of conducting paths.

What is claimed is:

1. A wire harness comprising: a conducting path including a conductor and a sheath, wherein the conductor comprises a first conductor and a second conductor which are connected to each other, the first conductor being disposed in a route regulation section requiring route regulation, the second conductor being disposed in another section than the route regulation section, wherein the conductor in which the first conductor and the second conductor are connected to each other is covered with the sheath, and wherein, in the conductor, the first conductor and the second conductor are connected to each other, and a diameter of the first conductor is substantially the same as a diameter of the second conductor.

2. The wire harness according to claim 1, wherein a forming treatment is applied to the first conductor and the second conductor in order to connect the first conductor and the second conductor to each other.

3. The wire harness according to claim 1, wherein a portion of the conducting path corresponding to a route regulation section of the wire harness has a first rigidity and another portion of the conducting path corresponding to another section other than the route regulation section has a second rigidity lower than the first rigidity.

* * * * *